United States Patent [19]

Wanner

[11] 4,123,074
[45] Oct. 31, 1978

[54] TOOL SHANK AND CHUCK COMBINATION FOR A HAMMER DRILL

[75] Inventor: Karl Wanner, Echterdingen, Fed. Rep. of Germany

[73] Assignee: Robert Bosch GmbH, Stuttgart, Fed. Rep. of Germany

[21] Appl. No.: 840,624

[22] Filed: Oct. 11, 1977

[30] Foreign Application Priority Data

Oct. 30, 1976 [DE] Fed. Rep. of Germany ....... 2650134

[51] Int. Cl.² ............................................. B25D 17/08
[52] U.S. Cl. .................................................. 279/19.5
[58] Field of Search ........................ 279/19, 19.4, 19.5, 279/19.6; 173/48

[56] References Cited

U.S. PATENT DOCUMENTS 2,572,840 10/1951 Curtis ................................... 279/19.5
3,458,210 7/1969 Whitehouse ......................... 279/19.5

Primary Examiner—Gil Weidenfeld
Attorney, Agent, or Firm—Michael J. Striker

[57] ABSTRACT

A hammer drill has a chuck forming a tool receptacle defining a chuck axis and provided with a tool-holding element radially displaceable into a position protruding into the tool receptacle. The tool has a shank defining a tool axis receivable axially in the receptacle. This shank is formed with a radially outwardly open recess closed at both of its axial ends and shaped to receive the tool-holding element, and with an axially extending groove separate from the recess and open axially at a free end of the shank. At least a section of the shank has a conical shape decreasing in a direction towards the free end of the shank. The shank may be provided with at least one cylindrical guiding section located adjacent to the above conical section.

10 Claims, 4 Drawing Figures

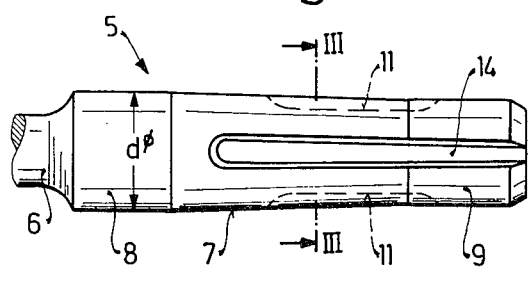
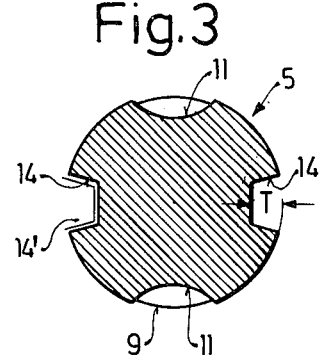
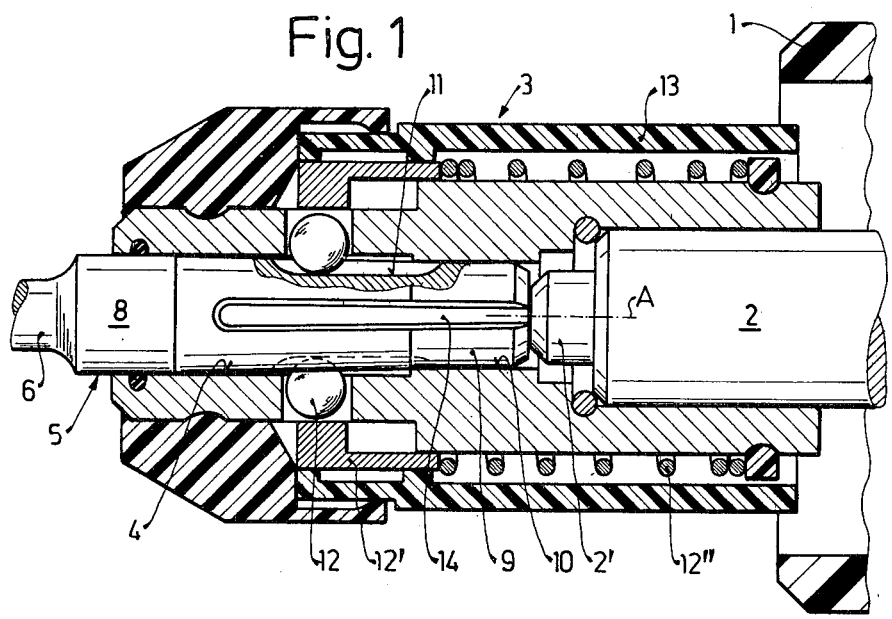
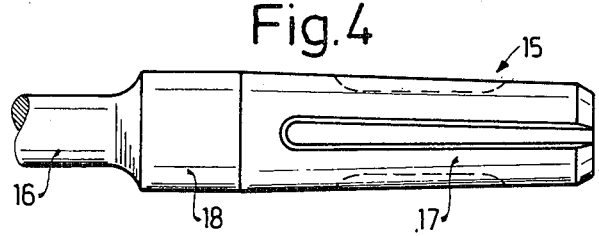

TOOL SHANK AND CHUCK COMBINATION FOR A HAMMER DRILL

BACKGROUND OF THE INVENTION

The present invention relates to a hammer drill. More particularly, this invention concerns a chuck and a tool for a hammer drill.

Chucks and tools for hammer drills have been proposed in the art, wherein a tool has a shank receivable axially in a receptacle of a chuck. The shank has a radially outwardly open recess which is closed at its both axial ends and adapted to receive a tool-holding element such as a ball. The shank also has axially extending groove separate from the recess and open at a free end of the shank, which groove is adapted to receive elongated projection formed in an inner wall of the receptacle of the chuck. The thus-constructed shank of the tool and the chuck transmit both a torque and an axial impact from the hammer drill to the tool.

Shanks of the known tools have been of a substantially cylindrical shape, and for this reason possessed certain disadvantages. The tools with the cylindrical shanks cannot be directly mounted in the type of chuck having conical receptacles which, although now old-fashioned, is still widely used in industry. In order to mount the tool with the cylindrical shank in a chuck having a conical receptacle, additional adapters must be used, which make the process of mounting difficult and complicated.

Furthermore, although it is generally desirable that in the case of the cylindrical shank impact energy is transmitted with great efficiency, there are instances when a reduction in the impact-energy transmission in operation of a hammer drill is preferred. Particularly, when a hammer drill having a great impact energy is used for driving small tools, e.g. drill bits, it is desirable to provide a comparatively small efficiency of energy transmission.

SUMMARY OF THE INVENTION

Accordingly, it is an object of the present invention to provide an improved chuck and tool for a hammer drill which avoid the disadvantages of the prior art chucks and tools.

More particularly, it is an object of the present invention to provide a chuck and tool combination for a hammer drill, wherein the tool can be directly mounted in chucks including those having conical receptacles for receiving the tools.

Another object of the present invention is to provide a chuck and tool combination wherein the tool can be mounted in a chuck having a conical receptacle, in a simple and easy way and without additional adapters.

Still another object of the present invention is to provide a chuck and tool combination wherein the efficiency of energy transmission from a hammer drill having great impact energy to a small tool, is deliberately reduced.

In keeping with these objects and with others which will become apparent hereinafter, one object of the invention resides, briefly stated, in a combination of a shank of a tool and a chuck of a hammer drill, wherein the shank has a portion receivable in a receptacle of the chuck and is formed with a radially outwardly open and axially closed recess adapted to receive a tool-holding element of the chuck, and with an axially extending and open at a free end of the shank grooves which is separate from the recess, which shank has a section of a conical shape decreasing in a direction towards the free end.

The shank of the tool constructed in accordance with the present invention can be inserted in old but still widely used chucks having conical receptacles for receiving the tools. No adapter elements are necessary in this case for mounting the this-constructed shank of the tool in the chuck. At the same time the efficiency of the energy transmission is lesser than that in the known constructions where the shank is of a cylindrical shape. The above decrease of efficiency of the energy transmission is favorable in the case when a hammer drill having great impact energy is used for driving a small tool.

Another feature of the present invention is that the shank having the above conical section, is also provided with a cylindrical guiding section located adjacent to the conical section. The cylindrical guiding section does not hinder insertion of the shank into the known conical chucks but essentially improves accuracy of guiding of the shank of the tool in the chuck of the hammer drill. Two such guiding sections may also be provided, located at both axial ends of the conical section of the shank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an axial section of the combination in accordance with the present invention;

FIG. 2 is a view showing a rear portion of a tool and a shank of the tool, in accordance with one embodiment of the present invention;

FIG. 3 is an enlarged section of the shank of the tool taken on line III—III of FIG. 2; and FIG. 4 is a view showing a rear portion of a tool and a shank of the tool, in accordance with another embodiment of the present invention.

DESCRIPTION OF THE PREFERRED EMBODIMENTS

As shown in FIG. 1 a hammer drill has a housing 1 with a spindle 2 defining an axis A. The spindle 2 is adapted to transmit, on the one hand, a torque and, on the other hand, an axial impact to a chuck 3 connected therewith. The chuck 3 has a cylindrical bore 4 which is concentric with the axis A of the spindle 2. A tool 6 has a shank 5 defining an axis which is coaxial with the axis A of the spindle 2. The shank 5 of the tool 6 is at least partially inserted in the cylindrical bore 4 of the chuck 3. A portion of the shank 5 of the tool 6 which is inserted in the bore 4 has a section 7 which is of a conical shape decreasing in a direction towards an inner free end of the shank 5.

The shank 5 has an outer guiding section 8 located adjacent to an outer end of the shank, which faces towards a working portion of the tool 6. The outer guiding section 8 is of a cylindrical shape and has an outer diameter corresponding to the inner diameter of the cylindrical bore 4 of the chuck 3. The shank 5 further has an inner guiding section 9 located adjacent to the inner end of the shank 5. The inner guiding section 9 is also of a cylindrical shape and has a diameter corresponding to the diameter of a cylindrical guiding bore 10 of the chuck 3. The guiding bore 10, in turn, has a diameter which is smaller than the diameter of the first-mentioned bore 4 of the chuck 3.

The shank 5 has two recesses 11 which are formed on one diagonal of a cross-section of the shank and located opposite one another. Each of the recesses 11 is closed at both of its axial ends. Locking elements 12 formed as balls are radially displaceable and engage in the recesses 11. A collar 12' presses the balls 12 into the corresponding recesses 11 of the shank 5. A spring 12" biases a sleeve 13 and the collar 14' forwardly. When the sleeve 13 is pulled axially, the balls 12 can move out of the recesses 11 of the shank 5 so that the tool 6 can be withdrawn from the chuck 3.

In addition to the recesses 11, the shank 5 of the tool 6 is provided with two grooves 14 which are formed on another diagonal of the cross-section of the shank 5 and located opposite one another. The diagonal on which the grooves 14 are formed is angularly displaced relative to the diagonal on which the recesses 11 are formed, for the angle of 90°. Each of the grooves 14 is open at the free end of the shank 5 and has two flat flanks extending in a substantially radial direction. Diametrically opposite ridges 14' are formed on a cylindrical inner wall of the bore 4 of the chuck 3 and engage in the above grooves 14. The radial depth "T" of the grooves 14 may be equal to substantially between 0.15 and 0.25 $d$, wherein "$d$" is a diameter of the outer cylindrical guiding section 8. Preferably, the radial depth "T" of the grooves 14 is equal to 0.2 $d$. A cross-section of the ridges 14' of the chuck 3 corresponds to the cross-section of the grooves 14 of the shank 5 with a small motion clearance. The free end of the shank 5 abuts against an extension 2' of the spindle 2 of the hammer drill. A front end portion of the tool 6 which is located in front of the shank 5 has a conventional construction, and for this reason is not shown in the drawing.

When the spindle 2 of the hammer drill rotates, a torque is transmitted through the ridges 14' of the chuck 3 engaged in the grooves 14 of the shank 5 of the tool 6. Since the associated surfaces of the ridges 14' and the grooves 14 are flat and extend in the radial direction, the force transmission is effected perfectly perpendicular to the above surfaces, in which case the force is transmitted not by edges of the recesses as in the known constructions, but by the surfaces, even in the case if they are badly worn. The recesses 11 of the shank 5 serve for only axial locking of the shank 5 in the chuck 3.

As shown in the drawing, the chuck 3 has two cylindrical bores 4 and 10 of different diameters, adapted to receive the outer guiding section 8 and the inner guiding section 9 of the shank 5, respectively. However, the chuck 3 may be formed only with the outer cylindrical bore 4 adapted to receive the outer guiding section 8 of the shank and without the inner cylindrical bore 10. It has been found that the outer guiding section 8 suffices for reliably centering the shank 5 in the chuck 3.

An essential advantage of the present construction, as compared with known constructions, such as e.g. that disclosed in the U.S. Pat. application No. 777,056, is that the shank 5 can be mounted in old but still widely used conical chucks. Such chuck, which is not shown in the drawing, has a conical bore in which the conical section 7 of the shank 5 of the tool 6 can be inserted. The torque in this case is transmitted by pure force locking, so that efficiency of force transmission is lesser than that in the above mentioned construction with shape locking force transmission. This is especially advantageous for the case when small tools such as drill bits are used in connection with hammer drills having a great impact energy, inasmuch as in the present construction the conical connection reduces the impact energy.

FIG. 4 shows a shank of a tool in accordance with another embodiment of the present invention. The shank is identified with reference numeral 15 whereas the tool is identified with reference numeral 16. Similarly to the shank 5 of the first embodiment of the invention which has the outer guiding section 8, the shank 15 in accordance with the further embodiment of the invention is provided with a cylindrical outer guiding section 18. The outer guiding section 18 is located outwardly adjacent to a conical section 17 of the shank 15. Contrary to the conical section 7 of the first embodiment of the invention, having an axial length substantially equal to half of the axial length of the shank 5, the conical section 17 of the shank 15 in accordance with the further embodiment of the invention extends up to the rear free end of the shank 15. The operation of the construction shown in FIG. 4 is identical to that shown in FIGS. 1–3.

Both the conical section 7 of the shank 5, and the conical section 17 of the shank 15 preferably has a ratio of convergence substantially equal to 1:20, which corresponds to the shape of the known conical chucks.

The chuck and tool combination in accordance with the present invention, wherein the shank has the above conical section, is more universal than the known constructions.

It is understood that the tool provided with the shank in accordance with the present invention can also be used in chucks of other constructions, such as in the chuck described in the U.S. Pat. application No. 777,056.

It will be understood that each of the elements described above, or two or more together, may also find a useful application in other types of constructions differing from the types described above.

While the invention has been illustrated and described as embodied in a chuck and a tool combination for a hammer drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with a chuck having a tool receptacle defining a chuck axis and tool-holding element radially displaceable into a position protruding into said receptacle, a tool having a shank which defines a tool axis and has a portion receivable axially in said receptacle, and having a free end, said shank being formed with a radially outwardly open recess closed at both of its axial ends and adapted to receive said tool-holding element, and with an axially extending groove separate from said recess and open axially at said free end, at least a section of said portion of said shank having a conical shape decreasing in a direction towards said free end and said chuck has a projection engaging in said axial groove of said shank.

2. The combination as defined in claim 1, wherein said axial groove of said shank has at least one substantially flat flank extending substantially radially of said tool axis.

3. The combination as defined in claim 1, wherein said tool has a working portion, said portion of said shank having another end spaced from said free end and adjacent to said working portion of said tool, said portion of said shank having an outer guiding section located adjacent to said other end and being of a cylindrical shape.

4. The combination as defined in claim 3, wherein said portion of said shank has an inner guiding section located adjacent to said free end and being of a cylindrical shape.

5. The combination as defined in claim 4, wherein said conical section of said shank merges into said inner cylindrical guiding section.

6. The combination as defined in claim 1, wherein said conical section of said shank has a ratio of convergence equal to 1:20.

7. The combination as defined in claim 1, wherein said conical section of said shank has an axial length substantially equal to at least half of the axial length of said shank.

8. The combination as defined in claim 3, wherein said axial groove of said shank has a depth equal to between 0.15 and 0.25 $d$, where "$d$" is a diameter of said outer guiding section of said shank.

9. The combination as defined in claim 8, wherein said axial groove of said shank has a depth equal to 0.2 $d$.

10. The combination as defined in claim 1, wherein said conical section of said shank decreases up to said free end of the latter.

* * * * *